Patented Aug. 21, 1951

2,564,889

UNITED STATES PATENT OFFICE 2,564,889

METHOD FOR PRODUCING ANTIBACTERIAL SUBSTANCE

Karl A. Folkers and Robert L. Peck, Plainfield, N. J., assignors to Merck & Co., Inc., Rahway, N. J., a corporation of New Jersey No Drawing. Application November 14, 1942, Serial No. 465,638

4 Claims. (Cl. 167—65)

This invention relates to new antibacterial substances, and to processes for the production thereof.

The known antibacterial substance, penicillin, is produced from the culture broth obtained by growing a selected strain of the mold *Penicillium notatum* on a suitable medium.

We have now discovered that a new antibiotic substance, which is both bacteriolytic and bacteriostatic, may be obtained from the culture mats obtained by growing *Penicillium notatum* sp. on Czapek-Dox medium, which medium is prepared according to Biochem. Jr., 26, 1907–18, 1932.

According to our invention, the Czapek-Dox medium (supra) is inoculated with *Penicillium notatum* sp. and growth is allowed to proceed at about 25–30° C. The period of growth is usually about 10 days, but we have obtained good yields of the new antibiotic substance from cultures grown for longer periods, for example, one month.

Within the purview of our invention, and as a further embodiment thereof, we have discovered that the addition of a small quantity of a soluble zinc salt, as for example, zinc acetate, to the culture medium, exerts a stimulating effect on the growth of the organism.

According to our invention, the culture mats are separated from the broth, and then subjected to extraction, preferably repetitive, with an organic solvent. Acetone, aliphatic alcohols, and chloroform are among the solvents which are satisfactory for this purpose. The extracts, preferably concentrated to small volume, are then filtered from precipitated crude antibiotic. The crude precipitated product is then purified. Most desirably, such purification may be effected by recrystallization from acetone. However, the product may also be purified by washing it with chloroform, filtering off the chloroform, and then crystallizing the residue on the filter from acetone. The crude precipitate may also be purified by preparing an alkaline aqueous solution thereof, and precipitating pure antibiotic therefrom by passing in carbon dioxide. It is also possible to purify the crude product by converting it to its acetate, purifying the acetate by crystallization, saponifying, extracting the saponified product with ether, evaporating the ether, and crystallizing the ether residue from acetone, although this method of purification is less satisfactory than the other procedures described herein.

The new antibiotic substance occurs in the form of a yellow pigment (needles) which has a small reddish-orange fluorescence. It exhibits pronounced antibacterial properties toward both gram-negative bacteria and gram-positive bacteria. For example, it has been found to be active against *Staphylococcus aureus*, a micrococcus (M. Y.), *S. pyogenes*, *E. typhi*, and *E. coli* at a concentration of 20–30 gamma/cc. in the bacteriostatic test. It is also bacteriolytic. One distinguishing characteristic, among others, of our product over penicillin, resides in the inhibitory effect which our product exhibits against *E. typhi* and *E. coli*. Penicillin is not active against either *E. typhi* or *E. coli*.

The expression "20–30 gamma/cc.," used above to define the activity of our product represents a more or less standard procedure of bio-assay and method of expression as applied to antibacterial substances of this type, and signifies that at a concentration of 30 gamma/cc., the product completely inhibits the growth of the bacteria, whereas growth occurs at a concentration of 20 gamma per cc.

The antibiotic substance appears to contain at least one phenolic hydroxy group, and one amino nitrogen group. It is very soluble in pyridine, soluble in ethyl or methyl alcohol, acetone, ether and chloroform, and somewhat soluble in benzene. In water, the solubility of the antibiotic substance is of the order of 1 mg./cc. at 30° C., and it is more soluble in a mixture of water and alcohol.

The antibiotic substance forms hydrohalic acid salts, such as the hydrochloride, and may also form alkali metal and alkaline earth metal salts. When oxidized with alkaline hydrogen peroxide, the antibiotic substance gives a crystalline product, colorless to light yellow, which melts at 117–118° C. When treated with diazomethane in nitrobenzene-ether mixture, the antibiotic substance gives a crystalline derivative.

The antibiotic substance may be acylated by treatment with appropriate reagents. Thus, the acetate may be prepared by reacting the latter with pyridine and acetic anhydride, or with acetic anhydride and sodium acetate. The benzoate may be prepared by reacting the antibiotic substance with benzoyl chloride and pyridine.

The crystalline acetate occurs in the form of light yellow needles. Both the antibiotic and its acetate have characteristic absorption spectra in the ultraviolet region. The acetate has a bright yellow fluorescence. On reduction with hydrogen in the presence of platinum, the acetate yields a crystalline substance melting at 196–198° C. (decomp.), which has a bright yellow fluorescence in ultraviolet light. On treatment with bromine, the acetate yields a crystalline derivative. The acetate also exhibits antibacterial activity.

The following example illustrates a method of carrying out the present invention, but it is to be understood that this example is given by way of illustration and not of limitation.

*Example*

165 liters of Czapek-Dox medium to which has been added 5 parts per million of zinc acetate, is inoculated with *Penicillium notatum* Westling sp. This is allowed to grow for ten days at 20–30° C. The culture mats are separated from the culture liquid, and extracted five times with acetone, and discarded. The acetone extracts are combined (total volume about 10 gallons) and concentrated to six liters, giving a yellow precipitate suspended in a red solution. The suspension is extracted five times with chloroform, and the two solutions are filtered from insoluble material, which is a brownish yellow powder weighing 4.44 grams (A). The chloroform solution is concentrated to 300 cc., and ether is added. The solution is filtered, and a further 2.25 grams (B) of yellow powder are obtained. The filtrate is then concentrated to a dark red oil, treated with petroleum ether, and filtered. 3.20 grams (C) of yellow powder are obtained. On concentration, the filtrate gives 25 grams of red oil (D). The activities of the various fractions have been found to be as follows:

(A)—20 gamma per cc.
(B)—20 gamma per cc.
(C)—20–50 gamma per cc.
(D)—50–100 gamma per cc.

The crude antibiotic substance (fractions A, B, and C; total weight 9.89 grams), is purified by several crystallizations from acetone.

The antibiotic substance is treated for the production of an ester as by example, with acetic anhydride and sodium acetate, to form the acetate, or with benzoyl chloride and pyridine to form the benzoate. The ester may be purified by recrystallization from chloroform, acetone, or chloroform-acetone mixtures.

The acetate appears to have the following carbon and hydrogen values: C, 70.61; H, 4.56; and to have an iodine number of about 160, when tested with the Rosenmund-Kuhnheim procedure. The compound also contains about 7% of nitrogen.

Modifications may be made in carrying out the present invention, without departing from the spirit and scope thereof, and we are to be limited only by the appended claims.

We claim as our invention:

1. The process for obtaining a substance having antibacterial activity against *E. coli* that comprises extracting culture mats of *Penicillium notatum* sp. with an organic solvent of the class consisting of acetone, chloroform, and lower aliphatic alcohols, concentrating the extracts thus obtained to form a precipitate, dissolving said precipitate in an aqueous alkaline solution, passing carbon dioxide into said aqueous alkaline solution to form a new precipitate, and recovering said last named precipitate.

2. The process for obtaining a substance having antibacterial activity against *E. coli* that comprises extracting culture mats of *Penicillium notatum* sp. with acetone concentrating the extracts thus obtained to form a precipitate, dissolving said precipitate in an aqueous alkaline solution, passing carbon dioxide into said aqueous alkaline solution to form a new precipitate, and recovering said last named precipitate.

3. The process for obtaining a substance having antibacterial activity against *E. coli* that comprises extracting culture mats of *Penicillium notatum* sp. with a lower aliphatic alcohol, concentrating the extracts thus obtained to form a precipitate, dissolving said precipitate in an aqueous alkaline solution, passing carbon dioxide into said aqueous alkaline solution to form a new precipitate, and recovering said last named precipitate.

4. The process for obtaining a substance having antibacterial activity against *E. coli* that comprises extracting culture mats of *Penicillium notatum* sp. with chloroform, concentrating the extracts thus obtained to form a precipitate, dissolving said precipitate in an aqueous alkaline solution, passing carbon dioxide into said aqueous alkaline solution to form a new precipitate, and recovering said last named precipitate.

KARL A. FOLKERS.
ROBERT L. PECK.

REFERENCES CITED

The following references are of record in the file of this patent:

Kocholaty: Journ. Bacteriology, March 1942, pages 469–477.

Meyer et al.: "Science," vol. 96, No. 2479, pages 20–21.

Fleming: Journ. of Experimental Pathology, 1929, pages 228–231.

"Nature," vol. 149, page 356, March 28, 1942; vol. 151, page 107.